Figure 1:
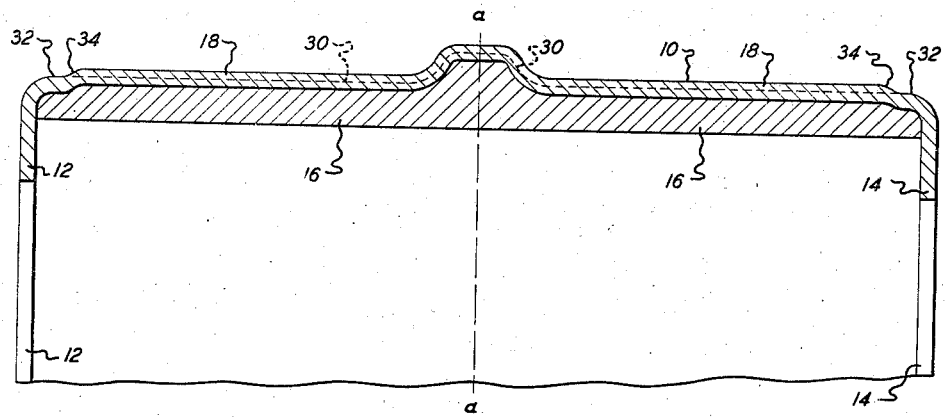

Jan. 2, 1945. C. HOLLERITH 2,366,262
BRAKE DRUM
Filed April 24, 1941

Inventor
CHARLES HOLLERITH
By Beaman & Langford
Attorney

Patented Jan. 2, 1945

2,366,262

UNITED STATES PATENT OFFICE 2,366,262

BRAKE DRUM

Charles Hollerith, Jackson, Mich., assignor to Hayes Industries, Inc., Jackson, Mich., a corporation of Michigan Application April 24, 1941, Serial No. 390,043

5 Claims. (Cl. 188—218)

The present invention relates to improvements in brake drum construction having particular reference to brake drums having an outer reinforcing shell of a material of high tensile strength, as for example, steel, and an inner wearing liner of a material of a lower modulus of elasticity, as for example, cast iron. Composite drums of this type of construction are of lighter weight and less expensive to fabricate than drums entirely fabricated from cast iron, especially where the composite drum is of a centrifugal cast construction.

In the manufacture of centrifugal cast brake drums, the outer shell of the drum may be formed by rolling strip sheet metal stock into a flanged circular rim with the opposite ends butt welded. This rim is then rotated at high speed and the cast metal flows into the rim and is distributed by centrifugal action to form an integral liner with the rim. In the manufacture of brakes for automobiles and airplanes, it has been the practice, in order to provide the outer shell with a torque flange of adequate strength, to roll the shell from $1/8''$–$3/16''$ stock with the cast liner on the order of $3/16''$ to $1/4''$ in thickness.

At the rate at which brakes are applied to bring automobiles and airplanes from operating and landing speeds to a full stop, extremely high surface temperatures are instantly generated along the inner wearing surface of the brake drum. This high differential in temperatures between the inner and outer surfaces of the drum upon repeated stops, in the case of heavy brake drums fabricated entirely of cast iron, causes the same to become out of round and/or shrink in diameter. Reduction in inner diameter of the brake drum from .020" to .080" upon as few as 100 stops have been experienced. With relatively thin steel drums reduction in diameter in the order of .080" have been noted in as few as two stops. In the case of centrifugal cast drums following standard practices in design, out of round conditions in the order of .020" have been experienced in as few as 20 stops with reduction in inner drum diameter in the order of .020" to .030" with a 12" drum in as few as 100 stops.

Thus it becomes the object of the present invention to provide a centrifugal cast brake drum of a construction which will not become warped or out of round or shrink to an objectionable degree under extended use.

Another object is to provide a brake drum having outer and inner structure of material of substantially different moduli of elasticity in which the ratio of thicknesses of the different material is approximately in the reverse ratio of their moduli of elasticity.

Another object is to provide a brake drum having an outer shell and a cast iron inner liner in which the thickness of the steel shell backing up the cast iron liner has been reduced over standard practices to a point eliminating to an objectionable extent warping, and the development of out of round conditions as well as shrinkage in service.

A further object is to provide a composite steel and cast iron drum in which the thickness of the steel is approximately $1/3$ the thickness of the cast iron.

A still further object is to provide a centrifugal cast brake drum work blank with a surface provision for facilitating the machining of the drum to bring the material of different moduli of elasticity into their preferred thickness ratio while providing a torque flange of adequate strength.

Figure 2:
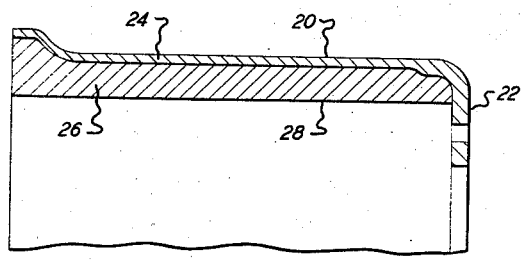
Figure 3:
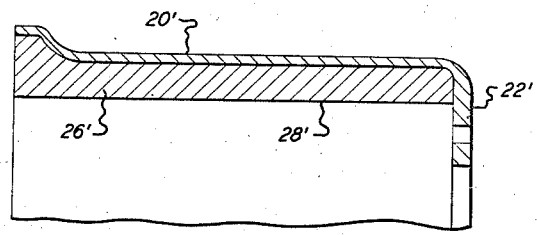

These and other objects and advantages residing in the combination, arrangement and construction of the parts will be apparent from the following specification and annexed claims when taken with the accompanying drawing, in which Fig. 1 is a fragmentary cross-sectional view of a work blank of a centrifugal brake drum before division, Fig. 2 is a similar view of a brake drum after division of the work blank of Fig. 1, and Fig. 3 is a view similar to Fig. 2 of a modified form.

Having reference to the accompanying drawing, in Fig. 1 is shown a fragmentary section through an annular rim 10 having flanges 12 and 14 to confine the cast metal inner liner 16 embraced by the outer shell portion 18. By splitting the rim 10 along the vertical line $a$—$a$ two similar centrifugal cast brake drums 20 result as shown machined in Fig. 2.

The drum 20 as shown in Fig. 2 comprises a torque flange 22 and an outer shell 24 of integral construction and preferably fabricated from a sheet material of relatively high tensile strength, as for example, steel. The shell 24 embraces an inner liner 26 presenting a wearing surface. The material making up the liner 26 will usually be of a lower modulus of elasticity than that of the shell 20, as for example, cast iron. I have found that by reducing the thickness of the shell 20 over standard practice, that repeated stops, instantly heating the surface 28 to high temperatures, will no longer result in the development of objectionable warping and "out of round" conditions or shrinkage of the brake drum. In one test ran upon a 12" drum in which the shell 20 was of steel in the order of $\frac{1}{16}$" thick and the liner 26 of cast iron in the order of $\frac{3}{16}$" thick along the major portion of its width, the out of round condition which developed upon 175 stops was in the order of .003" to .004". With a similar drum having a shell 20 in the order of $\frac{1}{8}$" thick which would correspond to standard practice, 20 stops produce an out of round condition in the order of .020. With the thinner outer shell, upon 100 stops, no appreciable reduction in diameter was experienced as compared with a reduction in diameter in the order of .020" to .030" with another shell of standard thickness.

The tests that have been run would appear to indicate that the ratio of the thicknesses of reinforcing shell 20 and the liner 26 should be in the reverse order of their moduli of elasticity. For example, in the case of steel and cast iron in which E is approximately 30,000,000 and 10,000,000, respectively, if the cast iron liner is $\frac{3}{16}$" thick, the shell 20 should be in the order of $\frac{1}{16}$" thick. It should be understood that the reference to steel and cast iron is by way of example only as the principles of the present development have equal application to other suitable metals and alloys. For example, the liner 26 could be of aluminum bronze or other suitable wearing material of a low modulus of elasticity.

In practice there is an advantage in rolling the shell 20 from stock of uniform thickness, with the thickness determined by the required strength of the torque flange 22. When such a practice is carried out in connection with the present invention it necessitates machining the shell 20 to the proper thickness in cases where the thickness of the torque flange will exceed the desired thickness of the shell 20. In Fig. 1 the dotted line 30 represents the amount of metal that is to be removed from the shell 20 in order to obtain the desired ratio of thicknesses between the shell 20 and liner 26. To facilitate the machining of the shell 20 to the desired thickness, the edge portions 32 are rolled with steps 34 of a depth corresponding to the amount of metal that is to be removed from the web of the drum. With this arrangement, at the time the drum is chucked in a lathe to be turned, the operator can gauge his depth of cut from the surface portion 32. Fig. 2 shows the drum with the shell 20 machined down to the dotted line 30 of Fig. 1. As shown, the torque flange 22 is approximately twice the thickness of the shell 20 as machined.

The form of the invention illustrated in Fig. 3 is without any arrangement for facilitating the machining of the shell 20' to the desired thickness, the stepped portion 32 having been eliminated.

Obviously, many methods of securing the desired thickness of material in the torque flange 22 and shell 20 will occur to those skilled in the art. For this reason, I do not wish to be limited to any specific manner for carrying out the principles of the present invention for eliminating objectionable warping and shrinkage in brake drums.

Having thus described my invention, what I desire to secure by Letters Patent and claim is:

1. A brake drum having an outer reinforcing shell and an inner wearing liner of different material, the ratio of thicknesses of said shell and liner to each other approximating the reverse ratio of their moduli of elasticity.

2. A brake drum having an outer reinforcing sheet metal shell and an inner cast metal wearing liner, the ratio of thicknesses of said shell and liner to each other approximating the reverse ratio of their respective moduli of elasticity.

3. A brake drum having an outer reinforcing sheet metal shell and an inner cast metal wearing liner, the ratio of thickness of said shell and liner to each other being in the order of 1 to 3 and approximating the reversed ratio of their respective moduli of elasticity.

4. A brake drum having an outer reinforcing steel shell and an inner cast iron liner, the steel shell being in the order of ⅓ or less the thickness of the cast iron liner, with the cross-sectional proportions of the steel shell and cast iron liner being such that the steel will have sufficient strength to reinforce and support the cast iron liner in use, yet the steel shell shall have insufficient tensile strength to resist expansion of the cast iron liner to an extent which would produce failure in compression of said liner, whereby warpage and shrinkage following repeated brake application is substantially obviated.

5. A centrifugal cast brake drum having a relatively thin outer steel reinforcing shell and a relatively thick inner wearing liner of cast iron, the major embracing portion of said outer shell being in the order of ⅓ or less of the thickness of the liner, with the cross-sectional proportions of the shell and liner being such that the shell has sufficient tensile strength to reinforce the liner in use, yet having insufficient tensile strength to resist expansion of said liner to an extent causing failure in compression of said liner, whereby warpage and shrinkage following repeated brake application is substantially obviated.

CHARLES HOLLERITH.